United States Patent [19]

Dietze et al.

[11] Patent Number: 4,532,090
[45] Date of Patent: Jul. 30, 1985

[54] METHOD AND APPARATUS FOR THE MANUFACTURE OF HIGH PURITY SILICON GRANULATE

[75] Inventors: Wolfgang Dietze; Hans J. Fenzl, both of Munich, Fed. Rep. of Germany

[73] Assignee: Siemens Aktiengesellschaft, Berlin and Munich, Fed. Rep. of Germany

[21] Appl. No.: 505,307

[22] Filed: Jun. 17, 1983

[30] Foreign Application Priority Data

Jun. 25, 1982 [DE] Fed. Rep. of Germany ....... 3223821

[51] Int. Cl.³ .............................................. B29C 6/00
[52] U.S. Cl. ......................................... 264/14; 264/13
[58] Field of Search ..................... 264/13, 14, 5, 9, 11, 264/38; 425/6

[56] References Cited

U.S. PATENT DOCUMENTS

| | | | |
|---|---|---|---|
| 3,023,171 | 2/1962 | Smith | 264/14 |
| 3,345,235 | 10/1967 | Miller | 264/14 |
| 3,457,335 | 7/1969 | Elliott | 264/13 |
| 3,530,207 | 9/1970 | Scheer | 264/14 |
| 3,689,607 | 9/1972 | Backlund | 264/13 |
| 4,081,500 | 3/1978 | Malcolm | 264/14 |
| 4,149,837 | 4/1979 | Baker et al. | 264/14 |
| 4,168,967 | 9/1979 | Sridhar et al. | 264/14 |
| 4,354,987 | 10/1982 | Iya | 264/14 |

Primary Examiner—Donald Czaja
Assistant Examiner—V. Fischbach
Attorney, Agent, or Firm—Herbert L. Lerner; Laurence A. Greenberg

[57] ABSTRACT

Manufacture of silicon granules from molten silicon by pouring molten silicon into a liquid body to solidify and granulate the silicon. The liquid body is substantially free of impurities which will contaminate the silicon.

5 Claims, 1 Drawing Figure

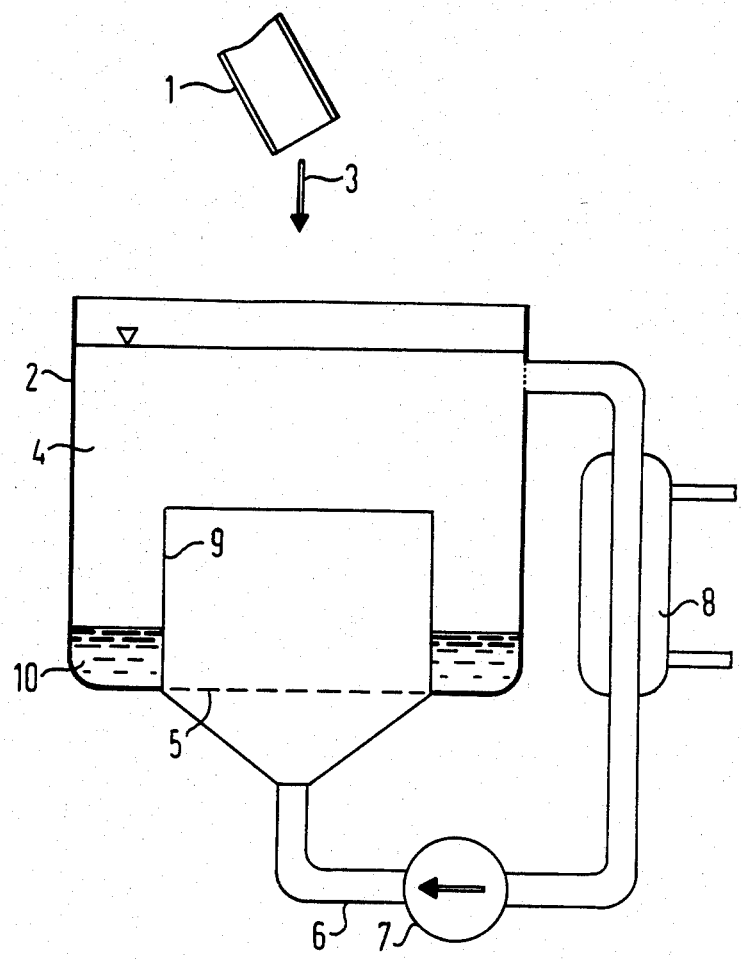

METHOD AND APPARATUS FOR THE MANUFACTURE OF HIGH PURITY SILICON GRANULATE

BACKGROUND OF THE INVENTION

1. Field of the Invention

The invention relates to a method and apparatus for the manufacture of high-purity silicon granulate from a silicon melt by the solidification thereof.

2. Description of the Prior Art

As is well known, silicon can be produced, for instance, in an arc furnace (German Published Non-Prosecuted Application No. DE-OS 32 21 675) in molten form. For further processing, this molten silicon is then allowed to solidify in an easy-to-handle form. Silicon in high-purity granulated form is required for crystal drawing from a crucible.

Heretofore, the silicon melt obtained from an arc furnace has been allowed to solidify in molds, for instance, trays or the like, and was subsequently broken into pieces. Contamination of the silicon is unavoidable in this procedure, because the silicon, of necessity, comes into contact with the ingot mold material and crushing tools.

SUMMARY OF THE INVENTION

It is therefore an object of the invention to provide a method and apparatus for producing high-purity granulate from a silicon melt, wherein contamination of the silicon through solidification in molds is avoided.

With the foregoing and other objects in view, there is provided in accordance with the invention a method for manufacturing silicon granules from molten silicon obtained by reduction of quartz with carbon in an arc furnace, which comprises pouring the molten silicon into a liquid body to solidify and granulate the silicon, said liquid body being substantially free of impurities which will contaminate the silicon.

Other features which are considered as characteristic for the invention are set forth in the appended claims.

Although the invention is illustrated and described herein as embodied in a method and apparatus for the manufacture of high-purity silicon granulate, it is nevertheless not intended to be limited to the details shown, since various modification may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates apparatus for carrying out the method in accordance with the invention. Molten silicon from an arc furnace is poured into a body of deionized water contained in a tank. A portion of the water is withdrawn from a point near the top of the tank, cooled by indirect heat exchange, and forced by a pump through a screen in the bottom of the tank such that the pumped water flows against the silicon melt flowing into the water thereby promoting granulation of the silicon. A collecting vessel open at the top and bottom is disposed around the screen with the water entering from beneath the screen floating the granules of silicon in the collecting vessel over the top into the adjacent region between the wall of the collecting vessel and the wall of the tank wherein the granules settle and can be discharged.

DETAILED DESCRIPTION OF THE INVENTION

According to the invention, high-purity silicon granulate is manufactured from a silicon melt by pouring the silicon melt into a liquid. An inorganic or an organic liquid can be used as the liquid. Suitable inorganic liquids are, for instance, molten tin and lead, while for the organic liquids, oils, for instance, silicone oils, incombustible hydrocarbons such as tetrachloroethylene or refrigerants such halogenated hydrocarbons, as for example dichlorodifluoromethane, sold under the trademark "Freon" can be used. The body of liquid is at a temperature to solidify and granulate the incoming silicon melt.

Temperatures below 500° C. will ordinarily be found satisfactory, but such temperatures will obviously vary dependent on the material of the liquid, for example, water, tin or lead.

Apparatus for carrying out this method is characterized by a tank with a screen bottom and/or a collecting vessel for collecting or settling and recovering the silicon granulate.

In a further embodiment of the invention the water is circulated against the inflowing silicon melt. The circulating water may, if desired be cooled, thereby cooling the liquid body into which the hot molten silicon flows.

In the following, the invention will be explained in greater detail, making reference to the drawing.

From a tube 1 which may be connected, for instance, to the tap hole of a known arc furnace in which quartz was reduced with carbon to produce molten silicon (not shown; see for instance, DE-OS 32 21 675), the molten silicon flows into a tank 2 containing a body of liquid, as indicated by an arrow 3. The body of liquid in the tank 2 is water 4 at about room temperature causing the molten silicon poured into the water 4 to solidify and granulate. The silicon granulate accumulates by settling at the bottom of the tank and is recovered by any suitable means, preferably by discharge means such as a valved outlet in the bottom of tank 2, not shown in the drawing.

To avoid an impairment of the purity of the silicon in the granulate formation, deionized water or water with additives which do not affect the purity of the silicon is used.

On the underside of the tank 2 is a screen inset 5, on which the granulate would normally be collected. A portion of the body of water 4 is withdrawn from tank 2 at a point remote from the point of introduction of the molten silicon into the body of water 4. The thus withdrawn water flows through conduit 6 wherein the water is cooled by indirect heat exchange with cooling device 8, for example, a jacket around conduit 6 through which cooling water flows. The cooled water is recirculated into the body of water 4 through the screen insert 5 by means of a pump 7 which forces the recirculating water to flow against the silicon melt flowing-in from tube 1, thus promoting the granulate formation.

Disposed in the tank 2 is a collecting vessel 9 which is an upright cylinder with its lower edge around the screen 5 and its upper edge extending to some point intermediate the bottom and top of tank 2. The water flow through screen 5 which goes from the bottom up and floats the silicon granulate over the upper edge of vessel 9 into an adjacent region 10 between the collecting vessel 9 and the wall of the tank 2. The silicon granules settle, collect and accumulate in region 10 from which they may be removed, preferably at the end of the operation.

The foregoing is a description corresponding, in substance, to German application P 32 23 821.5, dated June 25, 1982, international priority of which is being claimed for the instant application, and which is hereby made part of this application. Any material discrepancies between the foregoing specification and the specification of the aforementioned corresponding German application are to be resolved in favor of the latter.

We claim:

1. Method of manufacturing silicon granules from molten silicon obtained by reduction of quartz with carbon by solidification without contamination of the silicon, which comprises, maintaining a liquid body substantially free of impurities which will contaminate molten silicon poured into the body in a vessel in which the silicon will settle at the bottom, said vessel containing a partition extending from the bottom of the vessel to a height below the level of the body of liquid dividing the body of liquid into an inner region surrounded by the partition and an outer region extending from the partition of the inner region to the wall of the vessel, pouring the molten silicon into the body of liquid to solidify and granulate the silicon with the inflowing silicon moving downwardly into the inner region, at least during pouring of said silicon melt into the liquid body, withdrawing a portion of the liquid in the body from the body at a point remote from the point of introduction of the molten silicon into the liquid body and recirculating the portion of liquid into the body at the bottom of the inner region to flow upwardly against the downwardly moving inflowing silicon melt to concomitantly promote the granulate formation and to float the silicon granules from the inner region up over the partition and downwardly into the outer region to facilitate collection and recovery of the silicon granules.

2. Method according to claim 1, wherein the liquid body is cooled at least during pouring of said silicon melt into the liquid body.

3. Method according to claim 1, wherein the recirculated liquid is cooled by indirect heat exchange with a cooling medium.

4. Method according to claim 1, wherein the temperature of the liquid body is below 500° C.

5. Method according to claim 1, wherein the liquid is water substantially free of impurities which will contaminate the silicon.

* * * * *